3,259,006
RETAINING CLIP
Eugene H. Dukatz, Livonia, and Edward J. Marklow, Dearborn, Mich., assignors to Ford Motor Company, Dearborn, Mich., a corporation of Delaware
Filed June 4, 1964, Ser. No. 372,532
1 Claim. (Cl. 85—8.8)

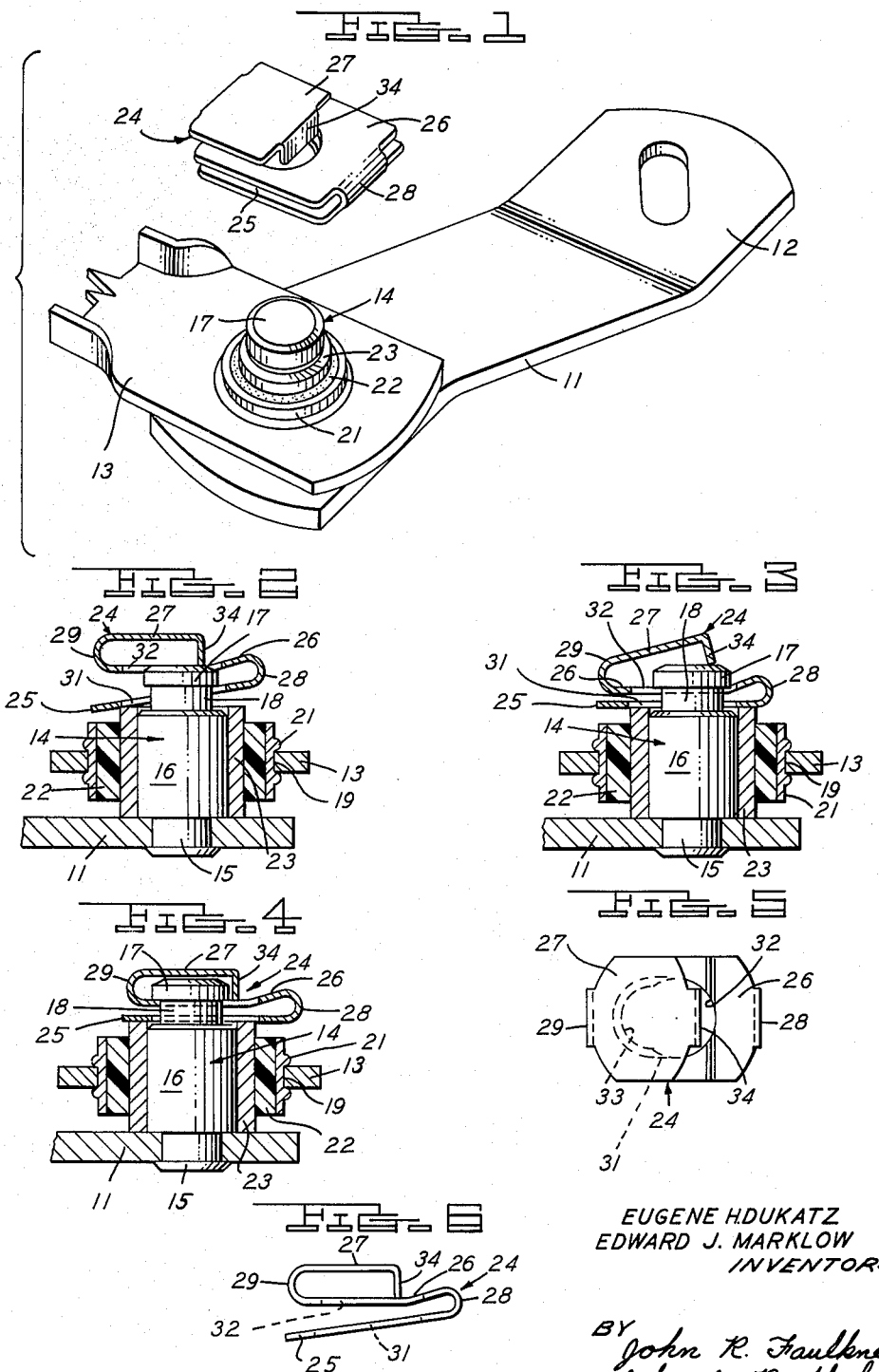

This invention relates to a spring clip fastener of a type for maintaining in coupled relationship a pair of links pivotally connected to each other through a pivot stud or the like.

Although there are disclosed in the prior art many forms and varieties of spring clip type fasteners or retention devices adapted to maintain a driven link or arm on a pivot stud or the like carried on a driving link or arm, none were found that would satisfactorily meet the specific requirements for maintaining vehicle windshield wiper assembly connecting links or arms in coupled relation to the driving links or arms. Fastener or retention devices for this application must be of the type that can be quickly, easily and, preferably, toollessly assembled. They must be easily removable to permit repairs to be made to the drive assemblies. An additional requirement is that they must permit a degree of movement of the links or arms relative to one another axially of the pivot stud as the links pivot.

Accordingly, it is an object of the present invention to provide a spring clip fastener or retention device having the desired characteristics to meet the requirements for windshield wiper drive assembly applications.

The spring clip fastener or retention device embodying the present invention is adapted to straddle an end of the pivot stud that forms the pivotal connection between the driving and the driven links or arms. This pivot stud is provided with a circular groove at its fastener receiving end. The fastener or retention device is provided with a plurality of superposed leg portions connected by reverse bend sections at alternate ends. A pair of the adjacent leg portions have aligned elongated apertures adapted to axially receive the pivot stud end during the assembly operation. The aperture in at least one of the pair of leg portions has a reduced portion at one end thereof which is adapted to encompass the circular groove upon the retention device being shifted laterally to a predetermined position after axial insertion of the stud end therethrough. The one leg portion of the retention device, when in the predetermined position, coacts with a wall of the groove to prevent axial displacement of the retention device from the stud end. Another of the superposed leg portions, which is not apertured, is provided with a terminal inturned flange. As the stud end is inserted through the apertures in the apertured leg portions, this terminal flange abuts the end face of the stud causing the leg portion on which it is carried to be flexed away from the other leg portions. But as soon as the retention device is shifted laterally into its nonaxially displaceable position, the flange is restored to its original position relative to the other leg portions. In this position it engages a side face of the stud to prevent further lateral shifting of the retention device so that it cannot be displaced from its nonaxially displaceable position. Before the spring clip retention device can be removed, the leg portion carrying the flange must be pried upwardly so as to raise the edge of the flange above the end face of the stud. When this is done, the retention device may be shifted transversely of the axis of the stud into an axially displaceable position relative to the stud.

The two superposed leg portions which are apertured are at a slightly diverging angle to each other in the free position. In assembled relationship, these legs are compressed slightly about the reversed bend section joining them, thereby maintaining the pivot joint in a substantially rattle-free condition. This arrangement permits, however, a reasonable degree of movement of the links or arms axially of the pivot stud and relative to one another, thus avoiding any tendency for the joint to bind because of any misalignment between the planes of the links or arms.

Other objects, features and advantages of this invention will be made more apparent as this description proceeds, particularly when considered in connection with the accompanying drawing, wherein:

FIG. 1 is an exploded perspective view of a pivotal connection between a pair of links utilizing the spring clip retention device embodying the present invention; and FIGS. 2, 3 and 4 are a vertical section through the pivot joint showing the several positions involved in placing the spring clip retention device in operative relationship to the pivot stud and links;

FIG. 5 is a plan view of the spring clip retention device embodying the present invention; and FIG. 6 is a side elevation of FIG. 5.

Referring now to the drawing, there is illustrated a link or arm 11 of a type to be found in a vehicle windshield wiper assembly. The link 11 is a driving link which is adapted to be mounted at its end 12 on a drive shaft coupled to a drive mechanism (not shown) for swinging the arm 11 back and forth. The driving link 11 is coupled to a connecting link, a fragmentary portion 13 of which is shown, which in turn is connected to other linkage or bell crank levers for driving the windshield wiper in a swinging reciprocable path along the surface of the windshield glass. The pivotal connection between the links 11 and 13 comprises a pivot stud, generally designated 14, having a shank portion 15 nonrotatably riveted to the driving link 11. The pivot stud 14 has an enlarged shoulder portion 16, an end portion 17 of somewhat smaller diameter than the shoulder portion 16, and a circular groove 18 interposed between the shoulder 16 and the end portion 17.

The connecting or driven link 13 has at its end which overlies the link 11 an enlarged aperture 19. The aperture 19 receives a steel sleeve 21 which encompasses a cylindrical bushing 22 of resilient material. The resilient bushing 22 in turn encompasses a metallic bushing 23 which is journalled for pivotal movement on the shoulder 16 of the pivot stud 14. It should be understood that the construction and arrangement of the apertured end of the connecting or driven link 13, the metallic sleeve 21, the resilient bushing 22 and the metallic bushing 23 is such that the bushing 23 is nonrotatably held relative to the arm 13.

The links or arms 11 and 13 are maintained in pivotally coupled relationship on the pivot stud 14 by a spring clip fastener or retention device, generally designated 24. The retention device 24 comprises an integral resilient steel member having three superposed leg portions 25, 26 and 27 which are connected at alternate ends by reverse bend sections 28 and 29.

The adjacent leg portions 25 and 26 have aligned elongated apertures 31 and 32 which are adapted to axially receive the end portion 17 of the pivot stud 14. The aperture 32 is reduced at one end 33 to a diameter complementary to the diameter of the groove 18 in the pivot stud, for a reason to be explained.

As best seen in FIG. 6, the leg portions 25 and 26, in free condition, are at a diverging angle to each other. The leg portion 27 is not apertured and is somewhat shorter than the leg portions 25 and 26. It terminates in an inwardly flange 34 which in free position abuts the upper surface of the middle leg portion 26.

Referring now to FIGS. 2, 3 and 4, the assembly of the spring clip retention device 24 is shown in sequence. The first step is to axially insert the end 17 of the pivot stud 14 through the aligned apertures 31 and 32 in the retention device leg portions 25 and 26. It will be noted (see FIG. 2) that after this is done the edge of the flange 34 on the leg 27 abuts the end face of the stud portion 17. The next step, as shown in FIG. 3, is to press down on the end 28 of the retention device legs 25 and 26 so as to align the upper surface of the leg 26 with the upper wall of the groove 18. This has the effect of compressing the legs 25 and 26 toward each other, the legs flexing about their connecting reverse bend section 28. Next the clip is moved transversely of the axis of the stud 14 to the right as viewed in the drawing. This brings the groove of the stud within the reduced diameter end 33 of the aperture 32 so that the upper wall of the groove 18 overlies the marginal portion of the end 33 of the aperture 32. The clip cannot now be axially displaced from the pivot stud. As the clip is moved transversely of the axis of the stud, the flange 34 of the leg portion 27 slides off the top surface of the pivot stud portion 17 and drops into abutting relation with the leg portion 26. The flange 34 thus holds the retention device against movement transversely of the pivot stud to the left as viewed in FIG. 4. The retention device cannot be moved further to the right as viewed in FIG. 4 because of the abutting relation between the edge of the reduced end portion 33 of the aperture 32 and the side face of the groove 18.

In order to remove the retention device from the pivot stud 14, it is necessary to pry the leg portion 27 upwardly so that the flange 34 thereon will clear the side face of the end portion 17 of the stud. The retention device then can be moved back to the position shown in FIG. 3. When in the position shown in FIG. 3 the retention device will pop up to the position shown in FIG. 2 in which it may be lifted from the upper portion of the pivot stud 14.

It will be understood that the invention is not to be limited to the exact construction and described, but that various changes and modifications may be made without departing from the spirit and scope of the invention, as defined in the appended claims.

We claim:

A spring clip retention device adapted to engage one end of a pivot stud pivotally coupling operating links together, said stud having grooved means therearound, said retention device comprising a resilient one-piece member having three superposed leg portions hingedly connected at alternate ends by reverse bend sections, an adjacent two of said leg portions having aligned elongated apertures and the third leg portion being unapertured and terminating in an inturned flange extending at substantially right angles to said third leg and overlying said apertures adjacent one end thereof in contiguous relation to the middle one of said three leg portions, said apertures being closed at each end thereof with the width of said apertures being greater than the diameter of the end of said stud, whereby said apertured leg portions are adapted to axially receive said end of said stud with said third leg portion being flexed away from said middle leg portion as the flange thereon abuts the end surface of said stud, the aperture in the middle leg portion being reduced at the end thereof remote from said inturned flange to a size complementary to the size of the groove means, said member being movable in one direction transversely of the stud to position a marginal edge of said reduced aperture end in abutting relation to a wall of said groove thereby inhibiting axial removal of said member from said stud, said flange of the third leg portion upon transverse movement of said member in said one direction being restored to contiguous relationship to said middle leg portion, whereby said flange extends alongside the end of said stud to prevent transverse movement of said member in the opposite direction, said apertured leg portions extending at a diverging angle to each other when in the free position.

References Cited by the Examiner

UNITED STATES PATENTS

| 1,058,583 | 4/1913 | Hart | 85—8.9 |
| 2,320,947 | 6/1943 | Martin et al. | 151—38 |
| 2,896,035 | 7/1959 | Harrington et al. | 151—41.75 |
| 3,178,987 | 4/1965 | Reese et al. | 85—8.8 |

FOREIGN PATENTS

| 662,879 | 12/1951 | Great Britain. |
| 879,341 | 10/1961 | Great Britain. |

CARL W. TOMLIN, *Primary Examiner.*

EDWARD C. ALLEN, *Examiner.*

R. S. BRITTS, *Assistant Examiner.*